US007552035B2

United States Patent
Cataltepe et al.

(10) Patent No.: US 7,552,035 B2
(45) Date of Patent: Jun. 23, 2009

(54) METHOD TO USE A RECEIVER OPERATOR CHARACTERISTICS CURVE FOR MODEL COMPARISON IN MACHINE CONDITION MONITORING

(75) Inventors: Zehra Cataltepe, Fair Haven, NJ (US); Claus Neubauer, Monmouth Junction, NJ (US); Chao Yuan, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 966 days.

(21) Appl. No.: 10/977,220

(22) Filed: Oct. 28, 2004

(65) Prior Publication Data

US 2005/0144537 A1   Jun. 30, 2005

(51) Int. Cl.
*G06F 17/10* (2006.01)
(52) U.S. Cl. .................. 703/2; 703/6; 702/19; 702/183
(58) Field of Classification Search .............. 703/2, 703/6, 13; 702/19, 183; 435/6, 7.23, 4; 382/132, 382/128; 706/46, 12; 536/24.3; 60/648, 60/650, 642, 698, 775, 274
See application file for complete search history.

(56) References Cited

U.S. PATENT DOCUMENTS

| 5,544,320 | A | | 8/1996 | Konrad | |
|---|---|---|---|---|---|
| 5,740,268 | A | * | 4/1998 | Nishikawa et al. | 382/132 |
| 5,741,648 | A | * | 4/1998 | Hemstreet et al. | 435/6 |
| 6,175,934 | B1 | | 1/2001 | Hershey et al. | |
| 6,343,251 | B1 | | 1/2002 | Herron et al. | |
| 6,438,484 | B1 | | 8/2002 | Andrew et al. | |
| 6,499,114 | B1 | | 12/2002 | Almstead et al. | |
| 6,556,951 | B1 | * | 4/2003 | Deleo et al. | 702/183 |
| 6,556,956 | B1 | | 4/2003 | Hunt | |
| 2003/0018394 | A1 | | 1/2003 | McCarthy et al. | |
| 2003/0199685 | A1 | * | 10/2003 | Pressman et al. | 536/24.3 |
| 2004/0059697 | A1 | * | 3/2004 | Forman | 706/46 |
| 2004/0101181 | A1 | * | 5/2004 | Giger et al. | 382/128 |
| 2004/0143402 | A1 | * | 7/2004 | Colinge et al. | 702/19 |
| 2004/0153249 | A1 | * | 8/2004 | Zhang et al. | 702/19 |
| 2005/0216426 | A1 | * | 9/2005 | Weston et al. | 706/12 |
| 2006/0088894 | A1 | * | 4/2006 | Wright et al. | 435/7.23 |

FOREIGN PATENT DOCUMENTS

EP    1 006 446 A2   6/2000

* cited by examiner

*Primary Examiner*—Paul L Rodriguez
*Assistant Examiner*—Kandasamy Thangavelu

(57) ABSTRACT

A method to use a receiver operator characteristics curve for model comparison in machine condition monitoring. The method and systems of using this method may be used to evaluate different monitoring models. These models may be used to monitor a variety of different systems such as power plant systems or magnetic resonance imaging systems. The methods use training data and designate one or more points in the data as a false negative, thereby permitting a receiver operator characteristics analysis to be performed. Multiple receiver operator characteristics analyses may be performed either on different models or on different points within a single model, thereby permitting the receiver operator characteristics analyses to be used to select a beneficial model for monitoring a particular system.

15 Claims, 2 Drawing Sheets

METHOD TO USE A RECEIVER OPERATOR CHARACTERISTICS CURVE FOR MODEL COMPARISON IN MACHINE CONDITION MONITORING

FIELD OF THE INVENTION

This invention is directed generally to model evaluation, and more particularly to evaluating models for monitoring systems.

BACKGROUND

Receiver Operating Characteristics (ROC) curves have long been used to evaluate classifier performance in many fields (e.g. signal detection and machine learning). An ROC curve provides information on the tradeoff between the hit rate (true positives) and the false alarm rates (false positives). In order to draw the ROC curve both positive and negative examples are needed.

In some applications, for example, machine condition monitoring, there are plenty of negative examples. However the positive examples are either rare, or do not fully describe the overall set of the possible positive examples. Instead of the positive examples, some rules about the positive examples are known. For example, if a sensor drifts off from the set of observed states by a certain amount, a fault has occurred.

In the prior art, ROC curves have not been considered as a criteria to compare different machine condition monitoring models. Some prior art references have used qualitative criteria to compare different methods and monitoring models. Still other prior art references have used accuracy. Some prior art references have used true and false positive rates, which correspond to a single point on the ROC curve, while others have used indications of increase/decrease in the signals as a model goodness criterion. Nevertheless, to date, no prior art references have taught or suggested the use of ROC curves as a means for comparing different operating models, especially those operating models used for monitoring power plants.

Accordingly, what is needed is a method of evaluating different models used for monitoring system. What is also needed is a method of selecting a model for monitoring a power plant. What is also needed is a method of evaluating monitoring models that may be used for other systems.

SUMMARY OF THE INVENTION

This present invention provides a method of using a receiver operator characteristics curve for model comparison in machine condition. The method and systems of using this method may be used to evaluate different monitoring models. These models may be used to monitor a variety of different systems such as power plant systems or magnetic resonance imaging systems. The methods use training data and designate one or more points in the data as a false negative, thereby permitting a receiver operator characteristics analysis to be performed. Multiple receiver operator characteristics analyses may be performed either on different models or on different points within a single model, thereby permitting the receiver operator characteristics analyses to be used to select a beneficial model for monitoring a particular system.

These and other embodiments are described in more detail below.

BRIEF DESCRIPTION OF THE DRAWINGS

Other objects, features and advantages of the present invention will become apparent upon reading the following detailed description, while referring to the attached drawings, in which.

DETAILED DESCRIPTION OF THE INVENTION

Figure 1:
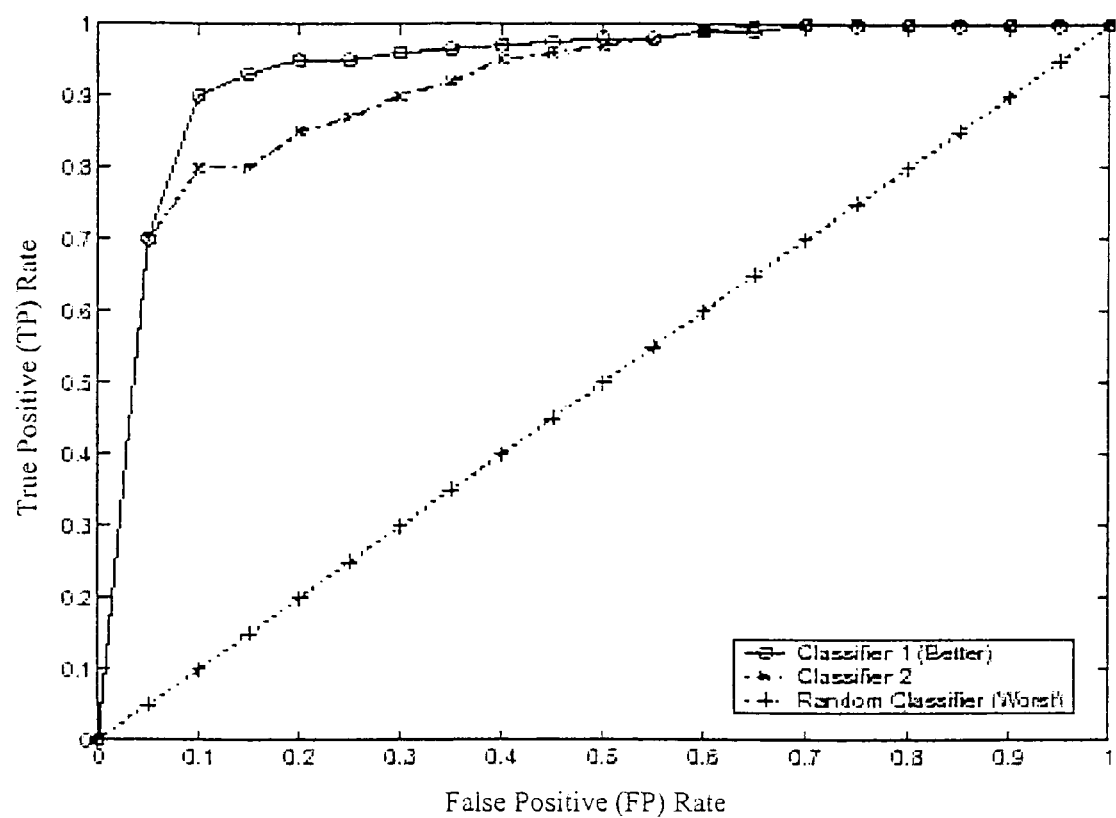
FIG. 1 shows an example of an ROC curve.

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of."

The present invention provides a method of using a receiver operator characteristics (ROC) curve for model comparison in machine condition. Often, a model used to monitor machine conditions is confronted with the question of how accurate a particular model is in monitoring machine conditions. The present invention provides a method and system to determine the ability of a model to discriminate between normal operations or a fault situation may be evaluated using Receiver Operating Characteristic (ROC) curve analysis.

When the results of a particular model are considered in two populations, one population with a normal operating condition, the other population operating with a fault, there will rarely be a perfect separation between the two groups. For every possible cut-off point or criterion value that is selected to discriminate between the two populations, there will be some instances with the system operating normally and correctly classified as positive (TP=True Positive fraction), but some instances with the system operating normally that will be classified negative (FN=False Negative fraction). On the other hand, some cases operating with a fault will be correctly classified as negative (TN=True Negative fraction), but some cases operating with a fault will be classified as positive (FP=False Positive fraction).

In machine monitoring, the systems are usually designed to minimize of eliminate instances wherein operation with a fault is classified as a positive as this result could be catastrophic. Nevertheless, if the system could be modified to utilize ROC curves, the overall evaluation of models used to monitor systems may be made more accurate that prior art evaluation systems. To use ROC curves in model evaluation, though, requires there to be some false positives for the analysis to exist.

Accordingly, the present invention provides a system and method for incorporating false positives into an evaluation system to permit ROC analysis to be used, therefore resulting in a better evaluation system for models used to monitor a system such as a power plant system.

The present invention uses ROC curves for analysis of different monitoring models. Many monitoring models provide sets of data during training or testing of the model in operating a power plant system or other monitored system. As this data, in many instances, does not show a fault as occurring (i.e. a negative result), the training data is clean. However, as specified to use ROC curves, it is necessary for there to be some positive results and some negative results to permit an ROC analysis to be performed to evaluate the quality of the model. Accordingly, the present invention evaluates the training data to determine one or more data points that may be within the accepted operating parameters (i.e. a positive), but are different from a majority of the other data points. These outlier data points are then designated as artificial negative points, thereby providing the needed negative points to perform an ROC analysis of this model. The determination of the one or more outlier points may be made by one or more determinators selected from, but not limited to, a trained technician, a statistical analysis of the data, a review of prior training data, or a combination thereof.

Once the positive and negative data points have been obtained, an ROC analysis may be performed on the data. This analysis will result in an ROC curve for that particular model. In general, a great deal of information may be obtained from a single ROC curve in regards to the effectiveness of the model. Nevertheless, in another aspect of the present invention, the ROC analysis may be performed on a plurality of models, with the ROC curves graphed together. As a result, the ROC curves may be used to compare different training models. The present invention may compare two, three or more models at the same time, thereby permitting a determination as to the best model that may be used to monitor a particular system. The ROC curves for the additional models may be obtained as previously described, wherein outlier data points are designated as artificial negatives to permit an ROC analysis to be performed on that particular model.

As the determination of which of the one or more outlier points may be made by different determinators, the present invention, in another embodiment, also contemplates that multiple ROC curves may be generated for a single set of training data by altering those points that are designated as artificial negatives. Used in this manner, the ROC analysis may be used to obtain all the different possibilities for a given model as well as comparing different models. For example, in a first embodiment, a technician may be used to determine the outlier data points and a first ROC analysis is performed. In a second embodiment, a statistical analysis is used to determine the outlier data points and a second ROC analysis is performed. Then, the two ROC curves may be graphed, thereby showing which determinator, the technician or the statistical analysis, was better.

Once an ROC analysis has been performed, the methods of the present invention may be used to determine which model is better at monitoring a given system. Based upon a review of the ROC curves, the curve showing the best ability to designate between false positives and false negatives in a given system may be selected.

More particularly, the methods of the present invention utilize one or more steps to permit the use of ROC to evaluate models. As an example, a classifier is trained using the training set. As used herein, a "classifier" may be considered to be a particular model for monitoring a system. Once the classifier is trained, it may be tested on a test set. Let the test inputs be $x_i$ in Rk and the test outputs be $t_i$ in {True, False}, i=1 to M. Let the classifier outputs for the $i^{th}$ test input be and $y_i$ in {True, False}. Then the true positive (TP) rate (or sensitivity) is defined as:

$$TP \text{ rate} =$$

$$TP \text{ rate} = \frac{\sum_{i=1}^{M} t_i = \text{True AND } y_i = \text{True}}{\sum_{i=1}^{M} t_i = \text{True}}$$

The false positive (FP) rate (or 1-specificity) is:

$$FP \text{ rate} = \frac{\sum_{i=1}^{M} t_i = \text{False AND } yi = \text{True}}{\sum_{i=1}^{M} t_i = \text{False}}$$

The ROC curve is produced by showing the FP rate on the x axis and the TP rate on the y axis. A classifier with a single TP and FP rate corresponds to a point on the ROC curve. Most classifiers have internal threshold parameters that affect whether the output is True or False. By moving the threshold parameter an ROC curve is obtained for a classifier for different threshold values. Area under the ROC curve (AUC) (for example is the sum of the ROC values for a classifier when the threshold value changes between certain two values. Area under the ROC is between 0.5 (random guessing) and 1.0 (perfect classifier). AUC may be used to compare performance of different classifiers. FIG. 1 shows an example of an ROC curve. As may be send from FIG. 1, classifier 1 is better than classifier 2 and classifier 2 is better than classifier 3.

In machine condition monitoring, the machine are operated under normal conditions and sensor data are collected. This sensor data may be used for training and calibrating (testing) a model that best describes the data set. Any future sensor reading significantly different from the training/calibration set needs to be caught up as early as possible. This may be seen in FIG. 2.

Figure 2:
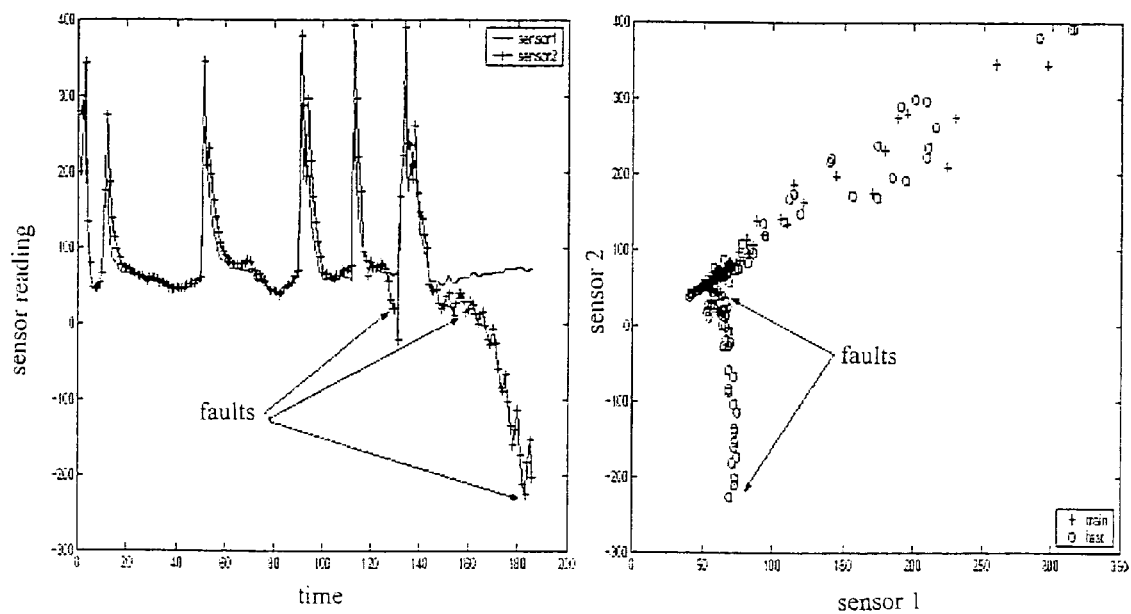
FIG. 2 shows sensor readings in time 1:80 may be used as training data according to one embodiment of the present invention.

FIG. 2 shows sensor readings in time 1:80 that may be used as training data in one embodiment of the present invention. There are faults in the test data, which may be seen as sensor 2 drifts off.

Although the goal is to be notified if the sensor readings (in Rk) are not normal, it may also be beneficial to know which sensor reading is not normal. Hence, instead of an Rk to R mapping, the model may, in one embodiment, do an Rk to Rk mapping, indicating which sensor went wrong. Hence, as used in the present invention, the ROC analysis for a model consists of k ROC curves, one curve per sensor.

Based on different sensors and faults on them, different information based on the ROC curves may be used to compare different models. For example:

Area under the ROC curve or a portion of the area under the ROC curve, for example near the operating thresholds.

The cost based on the whole a portion of the ROC curve. We define cost at a certain TP, FP value as Cost (FP, TP)=Cn*(1−TP)+CP*FP where Cn and Cp are the costs of false negatives and false positives respectively.

A weighted sum of the costs or areas for k sensors.

Machine condition monitoring data is very unbalanced, in the sense that the positive (faulty sensor) data is actually not in the training data. The analyst tries to assess the performance of a model by adding disturbances to the training data and noting if the model can recognize the added disturbance early enough. Early enough is usually expressed in terms of a threshold per sensor.

The ROC curve cannot be produced unless both negative (clean) and positive (faulty) sensor data is available. Accordingly, an algorithm to produce the faulty data based on the analyst specified sensor thresholds and the training data is generally provided.

To be able to use an ROC curve, a first aspect of the invention involves the setting aside of a portion of the original training set as the validation set. The training and validation sets (for a specific partition) may be denoted by:

$$X_{train}=\{x'_1, x'_2, \ldots, x'_{N_{train}}\} \quad (1)$$

$$X_{validation}=\{x''_1, x''_2, \ldots, x''_{N_{validation}}\} \quad (2)$$

$$X_{test}=\{x_1, \ldots, x_M\} \quad (3)$$

where $N_{train}+N_{validation}=N$ which was the original training set.

The labels $X_{train}$ and $X_{validation}$ are all False, because the training data is clean. The labels for the test set $X_{test}$ may contain positives.

Next, let the threshold for each input coordinate be $d_i$, $i=1, \ldots, k$, where k is the input dimensionality. Let $D_i$ denote a vector with zeros everywhere except $d_i$ at the $i^{th}$ coordinate.

To compare any two classifiers C1 and C2, both classifiers may be trained using the training data $X_{train}$. Note that the classifiers C1 and C2 may vary in a number of aspects, for example: a) they may use different machine learning algorithms or b) different settings of the same machine learning algorithm (for example K in K nearest neighbor, the number of hidden units in a back propagation network) c) they may also use different portions of the training set $X_{train}$ d) or they may use different sensors as inputs or outputs. Note also that the methodology below may be extended to regression models, by binarizing the model outputs according a different threshold per sensor.

Next, the validation set (Xvalidation) is used to generate the positive examples and hence extend the validation set as follows:

for each input coordinate i (1, . . . , k)
for each original validation input x"j (1, . . . , $N_{validation}$)

$$u=x''j+Di$$

if u is far from all validation data points by at least $d_i$ add u to the validation set.

Note that if the technician has more information about the fault distribution, for example more probability for negative drifts, more information on the distribution of faults (rather than just the threshold) the vector u in the algorithm above may be generated according to that information.

Next, the ROC curve for each classifier and sensor may be computed using the extended validation set. The thresholds of each classifier may be varied to obtain different TP and FP rates on the ROC curve. Note that, again based on the fault distribution, the contribution of each u (generated above) to the FP and TP rate values may be different.

Then, one or more evaluation standards may be used to determine whether a particular classifier is better than another. The evaluation standard is a quantity based on the ROC curves. Examples of evaluation standards that may be used in the present invention include, but are not limited to, a mean of the AUC's for all sensors, a mean cost over the sensors and thresholds, AUC around the thresholds, and/or average cost around the thresholds.

In addition the two classifiers, this method of comparing two classifiers may be extended to comparison of more than two classifiers by comparing the one or more evaluation standards.

Also note that generation of artificial faults in this way may be used not only for machine condition monitoring applications, but also any other application where the positive examples are scarce. One example is cancer detection (where there are images of many healthy cells but a small number of cancerous ones). Another example is in MRI imaging. In a first alternative embodiment, the present invention may be used in a service platform, for monitoring sensors of MRI devices. As the present invention is capable of monitoring all the sensors of an MRI machine at the same time, the present invention may have great utility in this area. Monitoring all the sensors could signal faults much earlier than monitoring than monitoring each sensor at a time. While monitoring the sensors, the ROC idea may be used to generate artificial faults (positive examples) and then measure the expected performance of a sensor monitoring system.

In a second alternative embodiment for MRI, such as in oncology, cardiology and neurology, as in the machine condition monitoring, there may be a lack or scarcity of positive examples. However, the experts have information on what would constitute a positive example. The positive examples could be generated based on the experts' knowledge and different preprocessing algorithms or machine earning models could be evaluated or trained based on the original negative and the artificial positive examples.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A computer implemented method of evaluating a monitoring model of a power plant system or a magnetic resonance imaging system, comprising:
    obtaining a first set of test data from the system through at least one monitoring sensor, the first set of test data including a first plurality of negative data points;
    designating at least one of the first plurality of negative data points as a first positive data point; and
    performing a first receiver operating characteristics (ROC) analysis on the first set of test data to obtain a first receiver operating characteristics analysis curve to be used as at least a portion of the monitoring model for the first set of test data;
    selecting an evaluation criteria for the model wherein the evaluation criteria is based on the first ROC;
    evaluating the monitoring model of the power plant system or magnetic resonance imaging system based upon the selected evaluation criteria from the first receiver operating characteristic analysis curve; and
    monitoring operating condition of the power plant system or magnetic resonance imaging system using the evaluated monitoring model.

2. The method of claim 1, wherein the step of designating at least one of the first plurality of negative data points as the positive data point is performed using a first determinator selected from a trained technician, a statistical analysis of the first set of data, a review of prior training data, or a combination thereof.

3. The method of claim 1, further comprising the steps of:
    obtaining a second set of test data from the system through at least one monitoring sensor, the second set of test data including a second plurality of negative data points;

designating at least one of the second plurality of negative data points as a second positive data point;

performing a second receiver operating characteristics analysis on the second set of test data to obtain a second receiver operating characteristics analysis curve for the second set of test data;

selecting a comparison criteria for comparing two or more receiver operating characteristics analysis curves based on the first ROC;

comparing the first receiver operating characteristics analysis curve with the second receiver operating characteristics analysis curve using the selected comparison criteria to select a monitoring model; and monitoring operating condition of the power plant system or magnetic resonance imaging system using the selected monitoring model.

4. The method of claim 3, wherein the step of designating at least one of the first plurality of negative data points as the first positive data point is performed using a first determinator selected from a trained technician, a statistical analysis of the first set of test data, a review of prior training data, or a combination thereof;

further wherein the step of designating at least one of the second plurality of negative data points as the second positive data point is performed using a second determinator selected from a trained technician, a statistical analysis of the second set of test data, a review of prior training data, or a combination thereof;

wherein the first determinator is different than the second determinator.

5. The method of claim 1, further comprising the steps of:

designating another of at least one of the first plurality of negative data points as a second positive data point;

performing a second receiver operating characteristics analysis on the first set of test data to obtain a second receiver operating characteristics analysis curve for the first set of test data;

selecting a comparison criteria for comparing two or more receiver operating characteristics analysis curves based on the first ROC;

comparing the first receiver operating characteristics analysis curve with the second receiver operating characteristics analysis curve using the selected comparison criteria to select a monitoring model; and monitoring operating condition of the power plant system or magnetic resonance imaging system using the selected monitoring model.

6. A machine-readable storage medium having stored thereon, computer-executable instructions which when executed by a computer perform a method to evaluate a monitoring model of a power plant system or a magnetic resonance imaging system, the method comprising:

obtaining a first set of test data from the system through at least one monitoring sensor, the first set of test data including a first plurality of negative data points;

designating at least one of the first plurality of negative data points as a first positive data point; and performing a first receiver operating characteristics (ROC) analysis on the first set of test data to obtain a first receiver operating characteristics analysis curve to be used as at least a portion of the monitoring model for the first set of test data;

selecting an evaluation criteria for the model based on the first ROC;

evaluating the monitoring model of the power plant system or magnetic resonance imaging system based upon selected evaluation criteria from the first receiver operating characteristic analysis curve; and monitoring operating condition of the power plant system or magnetic resonance imaging system using the evaluated monitoring model.

7. The machine-readable storage of claim 6, wherein the step of designating at least one of the first plurality of negative data points as the first positive data point is performed using a determinator selected from a trained technician, a statistical analysis of the first set of test data, a review of prior training data, or a combination thereof.

8. The machine-readable storage of claim 6, further comprising code sections executable by a machine for causing the machine to perform the steps of:

obtaining a second set of test data from the system through at least one monitoring sensor, the second set of test data including a second plurality of negative data points;

designating at least one of the second plurality of negative data points as a second positive data point;

performing a second receiver operating characteristics analysis on the second set of test data to obtain a second receiver operating characteristics analysis curve for the second set of test data;

selecting a comparison criteria for comparing two or more receiver operating characteristics analysis curves based on the first ROC;

comparing the first receiver operating characteristics analysis curve with the second receiver operating characteristics analysis curve using the selected comparison criteria to select a monitoring model; and monitoring operating condition of the power plant system or magnetic resonance imaging system using the selected monitoring model.

9. The machine-readable storage of claim 8, wherein the step of designating at least one of the first plurality of negative data points as a the first positive data point is performed using a first determinator selected from a trained technician, a statistical analysis of the first set of test data, a review of prior training data, or a combination thereof;

further wherein the step of designating at least one of the second plurality of negative data points as the second positive data point is performed using a second determinator selected from a trained technician, a statistical analysis of the second set of test data, a review of prior training data, or a combination thereof;

wherein the first determinator is different than the second determinator.

10. The machine-readable storage of claim 6, further comprising code sections executable by a machine for causing the machine to perform the steps of:

designating another of at least one of the first plurality of negative data points as a second positive data point;

performing a second receiver operating characteristics analysis on the first set of test data to obtain a second receiver operating characteristics analysis curve for the first set of test data;

selecting a comparison criteria for comparing two or more receiver operating characteristics analysis curves based on the first ROC;

comparing the first receiver operating characteristics analysis curve with the second receiver operating characteristics analysis curve using the selected comparison criteria to select a monitoring model; and monitoring operating condition of the power plant system or magnetic resonance imaging system using the selected monitoring model.

11. A computing system for evaluating a monitoring model of a power plant system or a magnetic resonance imaging system, comprising:

means for obtaining a first set of test data from the system through at least one monitoring sensor, the first set of test data including a first plurality of negative data points;

a first determinator for designating at least one of the first plurality of negative data points as a first positive data point; and means for performing a first receiver operating characteristics (ROC) analysis on the set of test data to obtain a first receiver operating characteristics analysis curve to be used as at least a portion of the monitoring model for the first set of test data;

means for selecting an evaluation criteria for the model based on the first ROC;

means for evaluating the monitoring model of the power plant system or magnetic resonance imaging system based upon selected evaluation criteria from the first receiver operating analysis characteristic curve; and means for monitoring operating condition of the power plant system or magnetic resonance imaging system using the evaluated monitoring model.

12. The computing system of claim 11, wherein the first determinator is selected from a trained technician, a statistical analysis of the first set of test data, a review of prior training data, or a combination thereof.

13. The computing system of claim 11, further comprising:

means for obtaining a second set of test data from the system through at least one monitoring sensor, the second set of test data including a second plurality of negative data points;

a second determinator for designating at least one of the second plurality of negative data points as a second positive data point;

means for performing a second receiver operating characteristics analysis on the second set of test data to obtain a second receiver operating characteristics analysis curve for the second set of test data;

means for selecting a comparison criteria for comparing two or more receiver operating characteristics analysis curves based on the first ROC;

means for comparing the first receiver operating characteristics analysis curve with the second receiver operating characteristics analysis curve using selected comparison criteria to select a monitoring model; and means for monitoring operating condition of the power plant system or magnetic resonance imaging system using the selected monitoring model.

14. The computing system of claim 13, wherein the first determinator is selected from a trained technician, a statistical analysis of the first set of test data, a review of prior training data, or a combination thereof;

further wherein the second determinator is selected from a trained technician, a statistical analysis of the second set of test data, a review of prior training data, or a combination thereof;

wherein the first determinator is different than the second determinator.

15. The computing system of claim 11, further comprising:

a determinator for designating another of at least one of the first plurality of negative data points as a second positive data point;

means for performing a second receiver operating characteristics analysis on the first set of test data to obtain a second receiver operating characteristics analysis curve for the first set of test data;

means for selecting a comparison criteria for comparing two or more receiver operating characteristics analysis curves based on the first ROC;

means for comparing the first receiver operating characteristics analysis curve with the second receiver operating characteristics analysis curve using the selected comparison criteria to select a monitoring model; and means for monitoring operating condition of the power plant system or magnetic resonance imaging system using the selected monitoring model.

* * * * *